United States Patent
Ha

(10) Patent No.: US 11,410,410 B2
(45) Date of Patent: Aug. 9, 2022

(54) METHOD AND APPARATUS WITH NEURAL NETWORK PROCESSING

(71) Applicant: Samsung Electronics Co., Ltd., Suwon-si (KR)

(72) Inventor: Sangwon Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 16/906,326

(22) Filed: Jun. 19, 2020

(65) Prior Publication Data

US 2021/0182594 A1   Jun. 17, 2021

(30) Foreign Application Priority Data

Dec. 16, 2019   (KR) .................. 10-2019-0168142

(51) Int. Cl.
*G06V 10/44* (2022.01)
*G06K 9/62* (2022.01)
*G06N 3/04* (2006.01)
*G06N 3/08* (2006.01)

(52) U.S. Cl.
CPC ......... *G06V 10/454* (2022.01); *G06K 9/6217* (2013.01); *G06N 3/04* (2013.01); *G06N 3/08* (2013.01)

(58) Field of Classification Search
CPC ...... G06V 10/454; G06K 9/6217; G06N 3/04; G06N 3/08
See application file for complete search history.

(56) References Cited

U.S. PATENT DOCUMENTS

| | | |
|---|---|---|
| 2018/0137600 A1 | 5/2018 | Ha |
| 2019/0042935 A1 | 2/2019 | Deisher |
| 2019/0147322 A1 | 5/2019 | Kim et al. |
| 2019/0171935 A1* | 6/2019 | Agrawal .............. G06N 3/0454 |
| 2019/0294413 A1* | 9/2019 | Vantrease ............. G06F 7/5095 |
| 2020/0210843 A1* | 7/2020 | Tao .......................... G06N 3/04 |

(Continued)

FOREIGN PATENT DOCUMENTS

| | | |
|---|---|---|
| CN | 109472353 A | 3/2019 |
| KR | 10-2019-0054454 | 5/2019 |

OTHER PUBLICATIONS

Zhang, et al., "A survey of recent advances in face detection." *Technical Report MSR-TR 2010-66* (2010). (17 pages in English).

(Continued)

*Primary Examiner* — Utpal D Shah
(74) *Attorney, Agent, or Firm* — NSIP Law

(57) ABSTRACT

A method of processing a neural network, includes generating an integral map for each channel in a first layer of the neural network based on calculating of area sums of pixel values in first output feature maps of channels in the first layer, generating an accumulated integral map by performing an accumulation operation on the integral maps generated for the respective channels, obtaining pre-output feature maps of a second layer, subsequent to the first layer, by performing a convolution operation between input feature maps of the second layer and weight kernels, and removing offsets in the weight kernels to obtain second output feature maps of the second layer by subtracting accumulated values of the accumulated integral map from pixel values of the pre-output feature maps.

24 Claims, 16 Drawing Sheets

(56) References Cited

U.S. PATENT DOCUMENTS

| | | | | |
|---|---|---|---|---|
| 2020/0210844 A1* | 7/2020 | Gao | ............... | G06N 3/04 |
| 2021/0004663 A1* | 1/2021 | Park | ............... | G06N 3/08 |
| 2021/0004679 A1* | 1/2021 | Yang | ............... | G06N 3/08 |
| 2021/0241082 A1* | 8/2021 | Nagy | ............ | G06F 12/0846 |

OTHER PUBLICATIONS

Zhang, et al. "Residual highway convolutional neural networks for in-loop filtering in HEVC." *IEEE Transactions on image processing* 27.8 (2018): 3827-3841. (15 pages in English).

Palossi, et al. "An open source and open hardware deep learning-powered visual navigation engine for autonomous nano-UAVs." *2019 15th International Conference on Distributed Computing in Sensor Systems (DCOSS)*. IEEE, 2019. (8 pages in English).

Extended European Search Report dated Feb. 24, 2021 in counterpart European Patent Application No. 20190797.9 (11 pages in English).

Robert M. Gray, et al. "*IEEE Transactions on Information Theory*", vol. 44, No. 6, Oct. 1998 "Quantization" (59 pages in English).

Krishnamoorthi, Raghuraman. "Quantizing Deep Convolutional Networks for Efficient Inference: A whitepaper." *arXiv preprint arXiv:1806.08342* (2018). (36 pages in English).

Jacob, Benoit, et al. "Quantization and Training of Neural Networks for Efficient Integer-arithmetic-only Inference." *Proceedings of the IEEE Conference on Computer Vision and Pattern Recognition*. 2018. (14 pages in English).

Ha, Sang-Won, et al. "Bandwidth Efficient Summed Area Table Generation for CUDA." *Journal of Korea Game Society* 12.5 (2012): 67-78. (12 pages in English).

\* cited by examiner

FIG. 4

<Floating point>

$$a \times 2^b$$

410

| Sign | Exponent (8 bits) | Fraction (23 bits) | bit positions: 31 | 30 ... 23 | 22 ... 0

= 0.15625

<Fixed point>

420

[sign] 1 bit
[exponent] m bits
[fraction] n bits

−0.0625
−8.0000
7.9375
0.0000

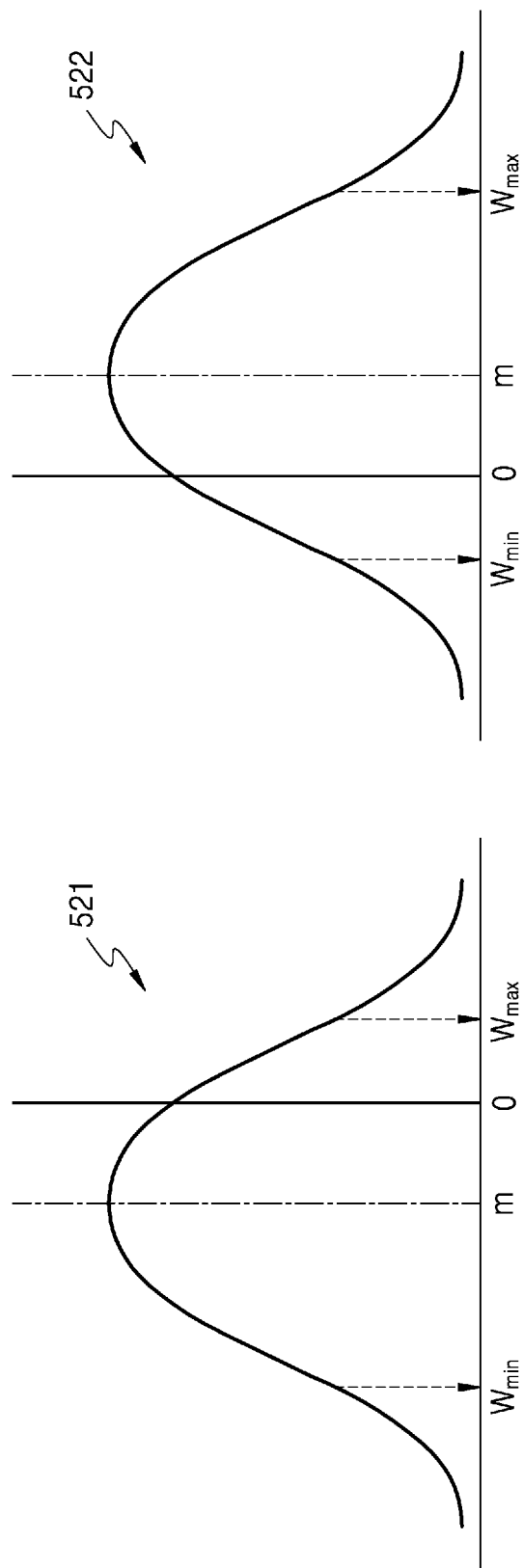

FIG. 6

$$sf = \begin{cases} \dfrac{clamp_{max} - clamp_{min}}{val_{max} - val_{min}} & \text{if } val_{max} \neq val_{min} \\ 1 & \text{if } val_{max} = val_{min} \end{cases}$$

$$off = \begin{cases} \dfrac{clamp_{min} * val_{max} - clamp_{max} * val_{min}}{val_{max} - val_{min}} & \text{if } val_{max} \neq val_{min} \\ 0 & \text{if } val_{max} = val_{min} \end{cases}$$

$$a \otimes w + b$$
$$= \left( \sum_{}^{cho} \sum_{}^{chi} \hat{a} \cdot \left( \frac{1}{sf_{Ai}} \hat{w} \right) - \boxed{offw \cdot \sum_{}^{cho} \frac{1}{sf_{Ai}} \sum_{}^{chi} \hat{a}} + sfw \cdot b \right) \cdot \frac{1}{sfw}$$

↓
OFFSET
(RESIDUAL DATA)

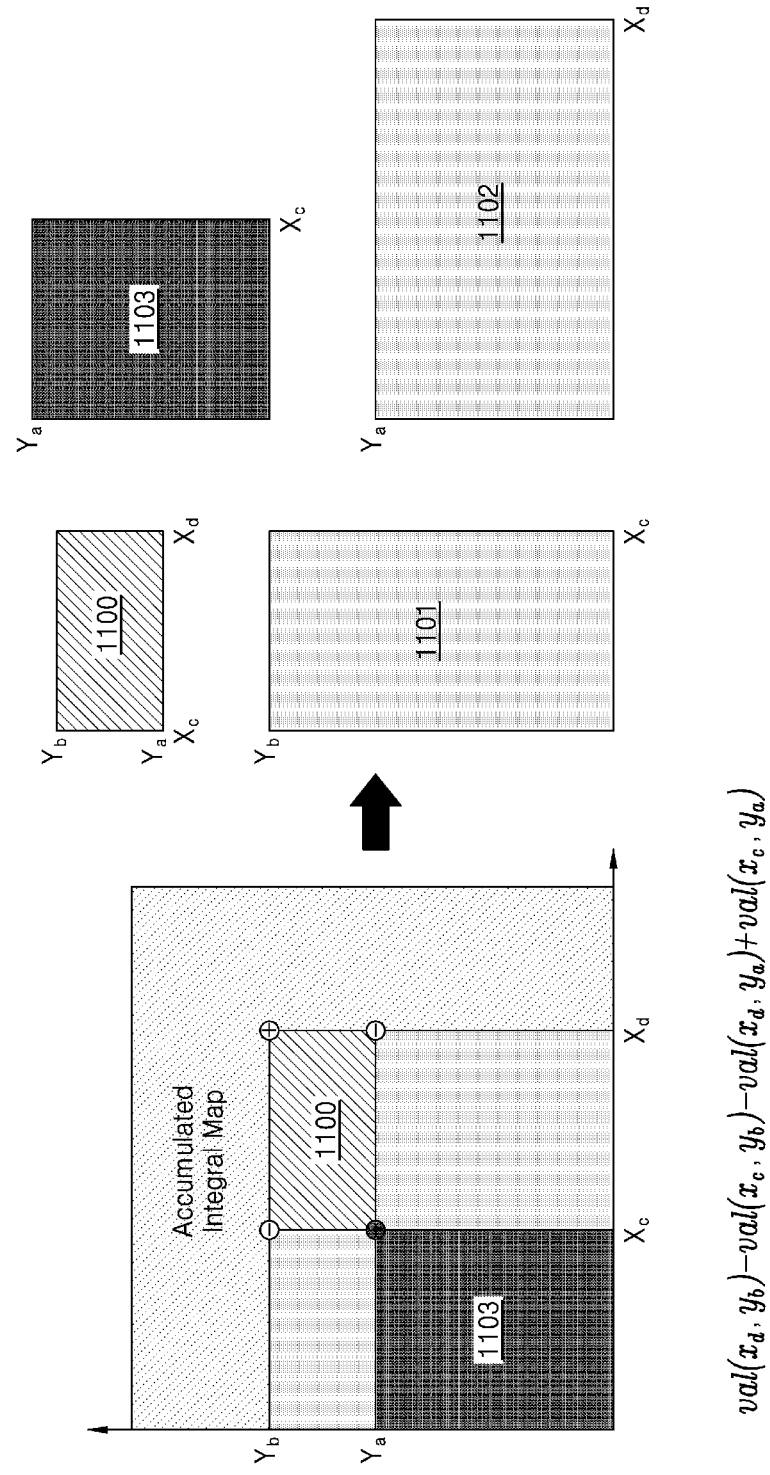

METHOD AND APPARATUS WITH NEURAL NETWORK PROCESSING

CROSS-REFERENCE TO RELATED APPLICATION

This application claims the benefit under 35 USC 119(a) of Korean Patent Application No. 10-2019-0168142, filed on Dec. 16, 2019, in the Korean Intellectual Property Office, the entire disclosure of which is incorporated herein by reference for all purposes.

BACKGROUND

1. Field

The following description relates to a method and apparatus with neural network processing.

2. Description of Related Art

A neural network is a computing system based on a computational architecture. Neural network technologies may analyze input data and extract valid information therefrom.

Neural network devices typically require large amounts of computation of complex input data. In order for a typical neural network device to process a large number of computations, an operation of reading or writing large amounts of data is typically necessarily performed for the computation from or to memory, and thus, a large amount of energy may be consumed due to frequent memory access. Low-power and high-performance systems, such as mobile or Internet of Things (IoT) devices, typically have limited resources, and thus typically require technologies that reduce energy consumption required to process a large amount of data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing a neural network, includes generating an integral map for each channel in a first layer of the neural network based on calculating of area sums of pixel values in first output feature maps of channels in the first layer; generating an accumulated integral map by performing an accumulation operation on the integral maps generated for the respective channels; obtaining pre-output feature maps of a second layer, subsequent to the first layer, by performing a convolution operation between input feature maps of the second layer and weight kernels; and removing offsets in the weight kernels to obtain second output feature maps of the second layer by subtracting accumulated values of the accumulated integral map from pixel values of the pre-output feature maps.

The method may further include performing recognition of the second output feature maps.

The weight kernels may include weights obtained by asymmetric quantization of the neural network.

The integral map may include data obtained by setting a value obtained by summing pixel values included in an area from a reference pixel of the first output feature map to a first output pixel of the first output feature map to a value of a pixel in an integral map corresponding to the first output pixel.

The reference pixel may be set to one of four corner pixels of the first output feature map.

The accumulated integral map may be generated by performing a pixel-wise accumulation operation on the integral maps generated for the respective channels.

The accumulated integral map may be generated from the first layer corresponds to data for offsets of the weight kernels of the second layer generated by the asymmetric quantization of the neural network.

The obtaining of the second output feature maps may include determining a bounding box of an input feature map mapped to the weight kernel to obtain a pre-output pixel of a pre-output feature map of the second layer; obtaining pixel values set to pixels of the accumulated integral map corresponding to four corner pixels of the bounding box; calculating an offset in a pixel value of the pre-output pixel based on the obtained pixel values; and obtaining a second output pixel of a second output feature map by subtracting the calculated offset from the pixel value of the pre-output pixel.

The four corner pixels of the bounding box may include an upper right pixel, an upper left pixel, a lower right pixel, and a lower left pixel of the bounding box. The obtaining of pixel values set to pixels of the accumulated integral map may include obtaining, from the accumulated integral map, a pixel value of a first integral map pixel corresponding to the upper right pixel, a pixel value of a second integral map pixel corresponding to the upper left pixel, a pixel value of a third integral map pixel corresponding to the lower right pixel, and a pixel value of a fourth integral map pixel corresponding to the lower left pixel.

Upon the reference pixel for generating the accumulated integral map is the lower left pixel of the first output feature map, the calculating of the offset may include calculating the offset in the pixel value of the pre-output pixel by subtracting a pixel value of the second integral map pixel and a pixel value of the third integral map pixel from a sum of a pixel value of the first integral map pixel and a pixel value of the fourth integral map pixel.

A non-transitory computer readable recording medium may store instructions that, when executed by a processor, causes the processor to control performance of the method above.

In another general aspect, a neural processing apparatus includes one or more processors configured to: generate an integral map for each channel in a first layer of a neural network based on calculating of area sums of pixel values in first output feature maps of channels in the first layer; generate an accumulated integral map by performing an accumulation operation on the integral maps generated for the respective channels; obtain pre-output feature maps of a second layer, subsequent to the first layer, by performing a convolution operation between input feature maps of the second layer and weight kernels; and remove offsets in the weight kernels to obtain second output feature maps of the second layer by subtracting accumulated values of the accumulated integral map from pixel values of the pre-output feature maps.

The weight kernels may include weights obtained by asymmetric quantization of the neural network.

The integral map may include data obtained by setting a value obtained by summing pixel values included in an area from a reference pixel of the first output feature map to a first output pixel of the first output feature map to a value of a pixel in an integral map corresponding to the first output pixel.

The reference pixel may be set to one of four corner pixels of the first output feature map.

The accumulated integral map may be generated by performing a pixel-wise accumulation operation on the integral maps generated for the respective channels.

The accumulated integral map generated from the first layer may correspond to data for offsets of the weight kernels of the second layer generated by the asymmetric quantization of the neural network.

The one or more processors may be further configured to: determine a bounding box of an input feature map mapped to the weight kernel to obtain a pre-output pixel of a pre-output feature map of the second layer; obtain pixel values set to pixels of the accumulated integral map corresponding to four corner pixels of the bounding box; calculate an offset in a pixel value of the pre-output pixel based on the obtained pixel values; and obtain a second output pixel of a second output feature map by subtracting the calculated offset from the pixel value of the pre-output pixel.

The four corner pixels of the bounding box may include an upper right pixel, an upper left pixel, a lower right pixel, and a lower left pixel of the bounding box. The one or more processors may be further configured to obtain, from the accumulated integral map, a pixel value of a first integral map pixel corresponding to the upper right pixel, a pixel value of a second integral map pixel corresponding to the upper left pixel, a pixel value of a third integral map pixel corresponding to the lower right pixel, and a pixel value of a fourth integral map pixel corresponding to the lower left pixel.

The one or more processors may be further configured to calculate the offset in the pixel value of the pre-output pixel by subtracting a pixel value of the second integral map pixel and a pixel value of the third integral map pixel from a sum of a pixel value of the first integral map pixel and a pixel value of the fourth integral map pixel, when the reference pixel for generating the accumulated integral map is the lower left pixel of the first output feature map.

The one or more processors may be further configured to generate the accumulated integral map based on the first output feature maps of the first layer that are read from a memory. The memory may store the generated accumulated integral map, and when the pre-output feature maps of the second layer is obtained, the one or more processors may be further configured to obtain the second output feature maps of the second layer by performing removal of the offsets by reading the generated accumulated integral map from the memory.

In another general aspect, a neural processing apparatus including one or more processors configured to obtain an accumulated integral map, obtain plural channels of a pre-output feature map of a second layer, subsequent to the first layer, in the neural network by performing convolution operations between plural channels of an input feature map of the second layer and weight kernels, and generate plural channels of an output feature map of the second layer by, for each channel of the output feature map, subtracting select accumulated values of the accumulated integral map from corresponding pixel values of the pre-output feature map.

The apparatus may further include generating respective integral maps based on calculating of area sums of respective pixel values in each of plural channels of a first output feature map in the first layer of a neural network.

The accumulated integral map may be generated by performing an accumulation operation on the respective integral maps.

Other features and aspects will be apparent from the following detailed description, the drawings, and the claims.

BRIEF DESCRIPTION OF THE DRAWINGS

FIG. 4 is a view for floating-point and fixed-point operations examples.

FIGS. 5A and 5B are views for example methods of quantizing floating-points to fixed points, according to one or more embodiments.

FIG. 6 is a view of a weight offset of a convolution operation generated by an asymmetrically quantized weight, according to one or more embodiments.

FIGS. 11A and 11B are views of a generation of an output feature map by removing an offset from a pre-output feature map by using an accumulated integral map, according to one or more embodiments.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
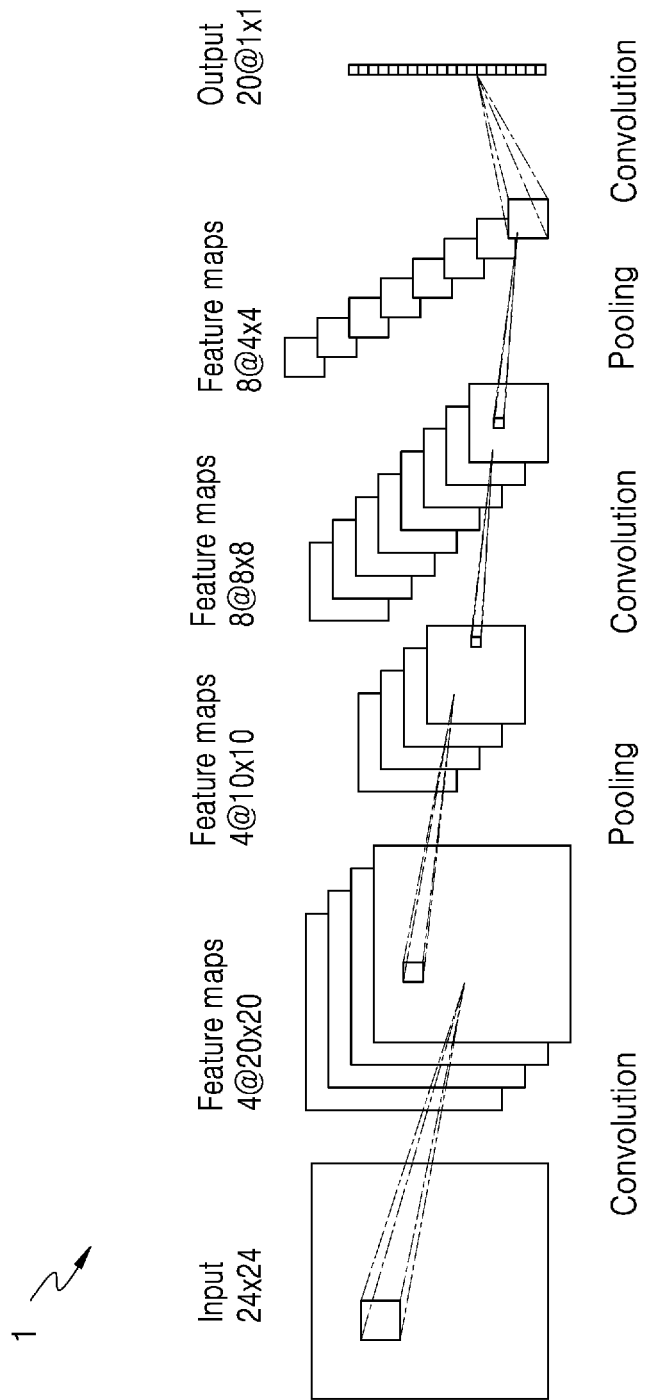
FIG. 1 is a view for an architecture of a neural network, according to one or more embodiments.

FIG. 1 is a view for an architecture of a neural network 1 according to one or more embodiments.

In FIG. 1, the neural network 1 may have an architecture of a deep neural network (DNN) or an n-layers neural network. The DNN or n-layers neural network may correspond to a convolution neural network (CNN), a recurrent neural network (RNN), a deep belief network, or a restricted Boltzmann machine. For example, the neural network 1 may be implemented as a CNN, but the type of the neural network 1 is not limited thereto. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The neural network 1 may be implemented as a computing architecture having a plurality of layers, with respect to an input image, feature maps, and an output. In the neural network 1, an input image may be convolution-operated with a filter called a weight kernel, and an output feature map (OFM) may be output as a result thereof. The generated output feature map may be convolution-operated again with a kernel as an input feature map (IFM) of a next layer, and a new output feature map output by the next layer. As a result of repeatedly performing the convolution operation, an identification result of the features of an input image may be output through the neural network 1.

For example, when an image of 24×24 pixels is input to the neural network 1 of FIG. 1, the input image may be output as 4-channel feature maps each having a 20×20 pixel size through a convolution operation with kernels. Thereafter, the size of each of the 20×20 feature maps is reduced through the repeated convolution operation with further kernels, and finally features having a 1×1 pixel size may be output. In this state, the neural network 1 repeatedly performs, in many layers, convolution operations and pooling operations (or sub-sampling) so as to filter from the input image features, e.g., strong features, that may represent the entire image and output the filtered features, and thus the identification result of the input image may be produced through the output final features.

Figure 2:
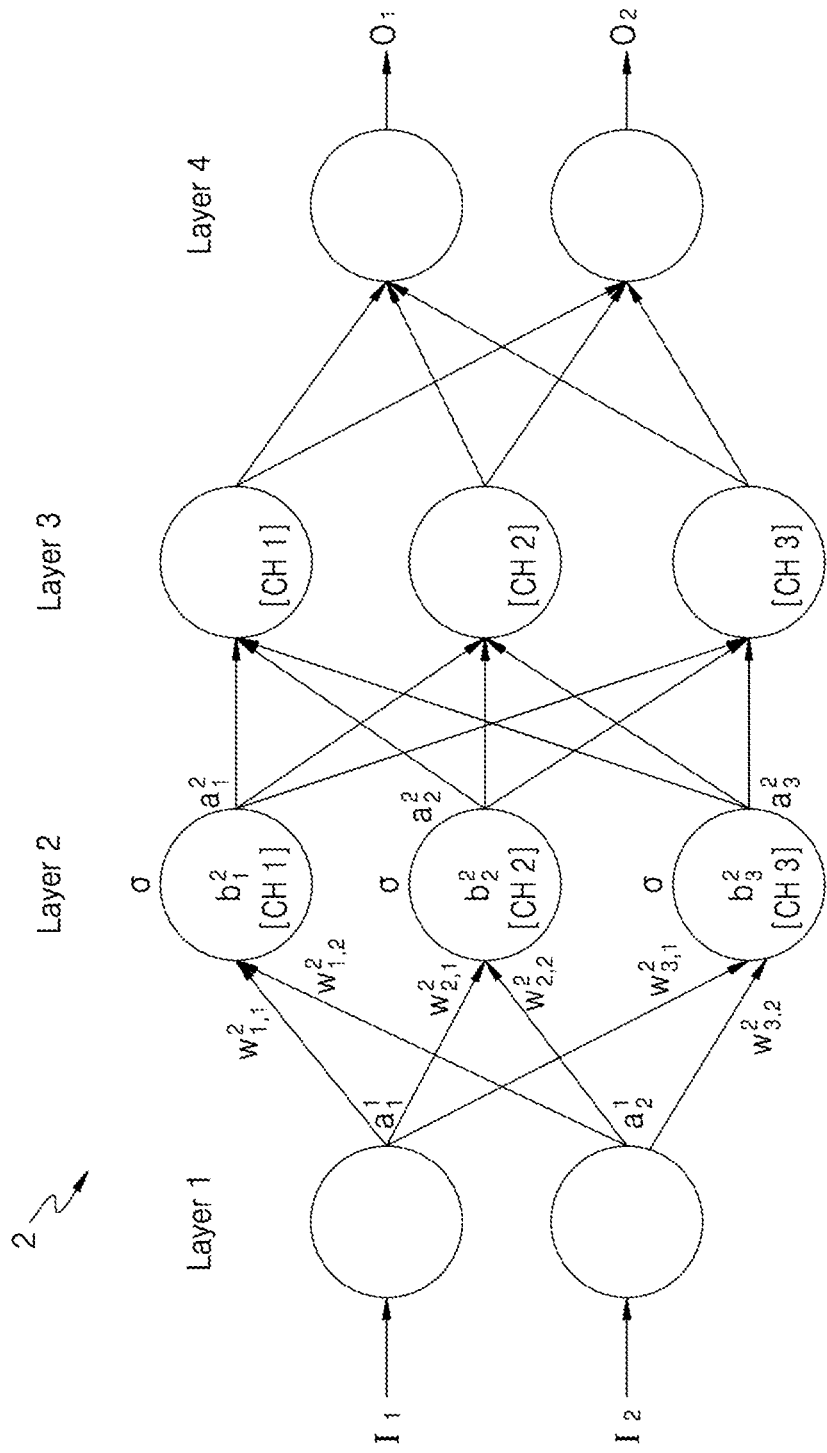
FIG. 2 is a view for an operation performed in a neural network, according to one or more embodiments.

FIG. 2 is a view for an operation performed in a neural network 2, according to one or more embodiments.

In FIG. 2, the neural network 2 has a structure including an input layer, one or more hidden layers, and an output layer, and may perform an operation based on received input data, for example, I1 and I2, and generate output data, for example, O1 and O2, based on a result of the operation.

The neural network 2, as described above, may be a DNN or n-layers neural network including two or more hidden layers. For example, as illustrated in FIG. 2, the neural network 2 may be a DNN including an input layer (Layer 1), two hidden layers (Layer 2 and Layer 3), and an output layer (Layer 4). When the neural network 2 is implemented as a DNN architecture, the neural network 2 may include more layers capable of processing information, and thus the neural network 2 may process data sets that are more complex than a neural network having a single layer. Although the neural network 2 is illustrated as including four layers, this is a mere example, and the neural network 2 may include more or less layers or more or less channels each having one or more artificial nodes. In other words, the neural network 2 may include various structures of layers that are different from the structure illustrated in FIG. 2.

Each of the layers included in the neural network 2 may include a plurality of channels. Each channel is representative of one or more artificial nodes, also referred to as respective neurons, processing elements (PE), units. For example, as illustrated in FIG. 2, Layer 1 may include two channels (nodes), and Layer 2 and Layer 3 each may include three channels. However, this is a mere example, and each of the layers included in the neural network 2 may include various numbers of channels (and respective nodes).

The channels (nodes) included in each of the layers of the neural network 2 may be connected to other channels (nodes), all of which are capable of processing data. For example, one channel (node) may receive data from other channels (nodes) to operate, and output an operation result to other channels (nodes).

An input and an output of each channel, or each node, may be respectively referred to as an input activation (e.g., as having been an activation out of another activation layer) and an output activation. In other words, the activation may be a parameter corresponding to an output of one channel (or one node) and simultaneously to an input of channels (and respective nodes) included in a next layer. Each channel (or node) may determine its own activation output based on input activations and connection weights predetermined for inputs from channels (respective nodes) included in a previous layer. A weight is a parameter used to calculate the output activation in each channel (node), which may be a value assigned to a connection relationship between channels (or respective nodes). The input or input activation corresponds to an IFM, and the output activation corresponds to OFM.

Each channel (or each node or plural nodes of each channel) may be processed by a computational unit or a processing element that outputs an output activation based on received input, and input-output of each channel (node) may be mapped with each other. For example, "σ" is an activation function, "$w_{jk}^i$" is a weight from a k-th channel (or node) included in a (i−1)th layer to a j-th channel (or node) included in an i-th layer, "$b_j^i$" is a bias of the j-th channel (node) included in the i-th layer, and when "$a_j^i$" is an activation of the j-th (node) channel of the i-th layer, the activation "$a_j^i$" may be calculated by using Equation 1 below.

$$a_j^i = \sigma\left(\sum_k (w_{jk}^i \times a_k^{i-1}) + b_j^i\right) \quad \text{Equation 1}$$

As illustrated in FIG. 2, an activation of a first channel CH 1 (or first node) of a second layer Layer 2 may be expressed by "$a_1^2$". Furthermore, the "$a_1^2$" may have a value of "$a_1^2 = \sigma(w_{1,1}^2 \times a_1^1 + w_{1,2}^1 \times a_2^1 + b_1^2)$" according to Equation 1. However, Equation 1 is a mere example for describing the activation and the weight used to process data in the neural network 2, the disclosure is not limited thereto. The activation may be a value obtained by passing, through a rectified linear unit (ReLU), a value obtained by applying an activation function to the sum of activations received from a previous layer.

As described above, in the neural network 2, numerous data sets are exchanged between a plurality of channels (or nodes) that are connected to one another, and undergo numerous operation processes incrementally though multiple layers. In this state, as data may correspond to floating-points of various precisions, the neural network 2 may perform quantization of parameters, for example, activations or weights, of a neural network to lower a precision loss while reducing an amount of computations for processing complex input data, such as floating-points.

Figure 3A:
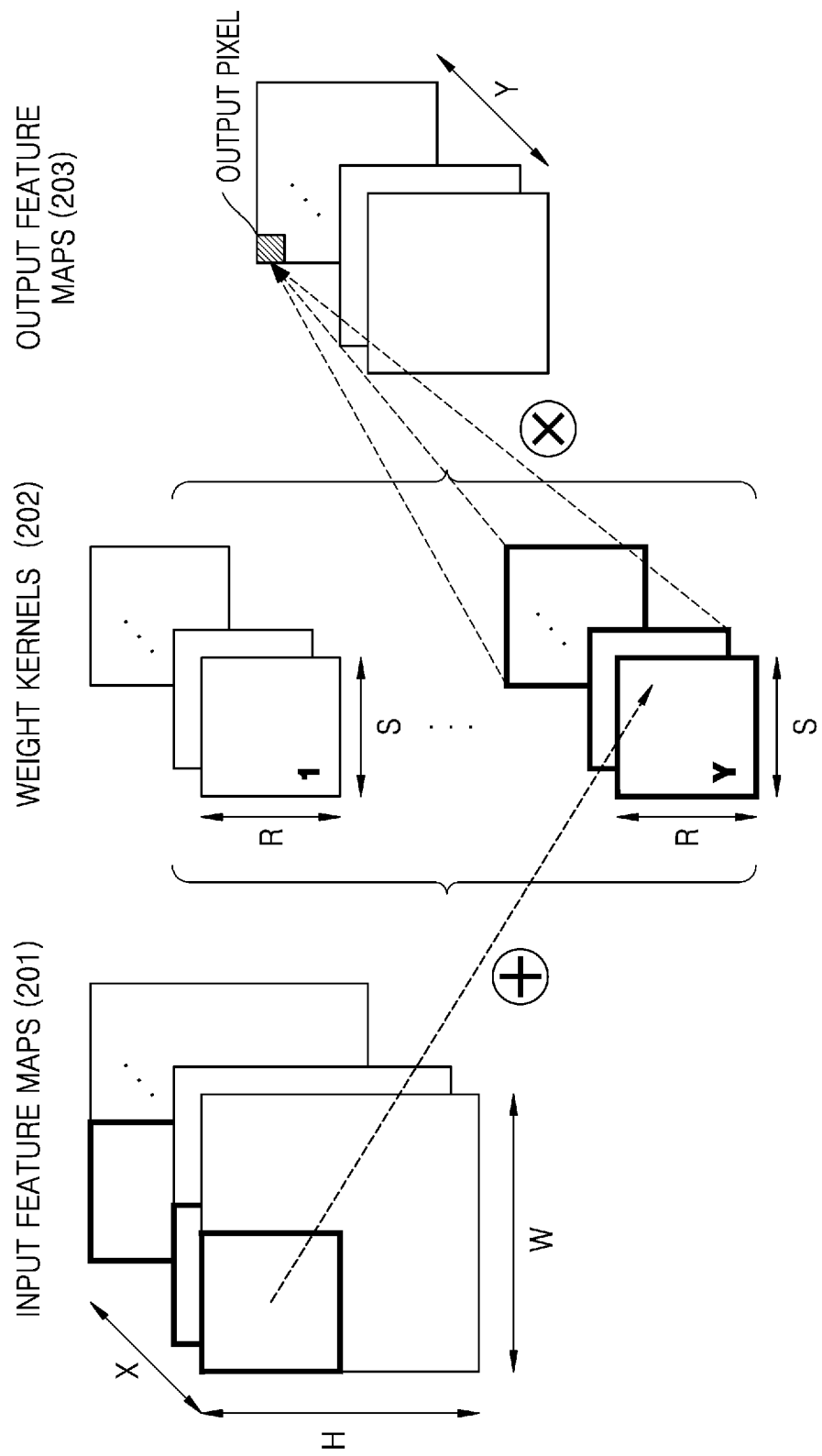
FIGS. 3A and 3B are views for examples of convolution operation of a neural network.
Figure 3B:
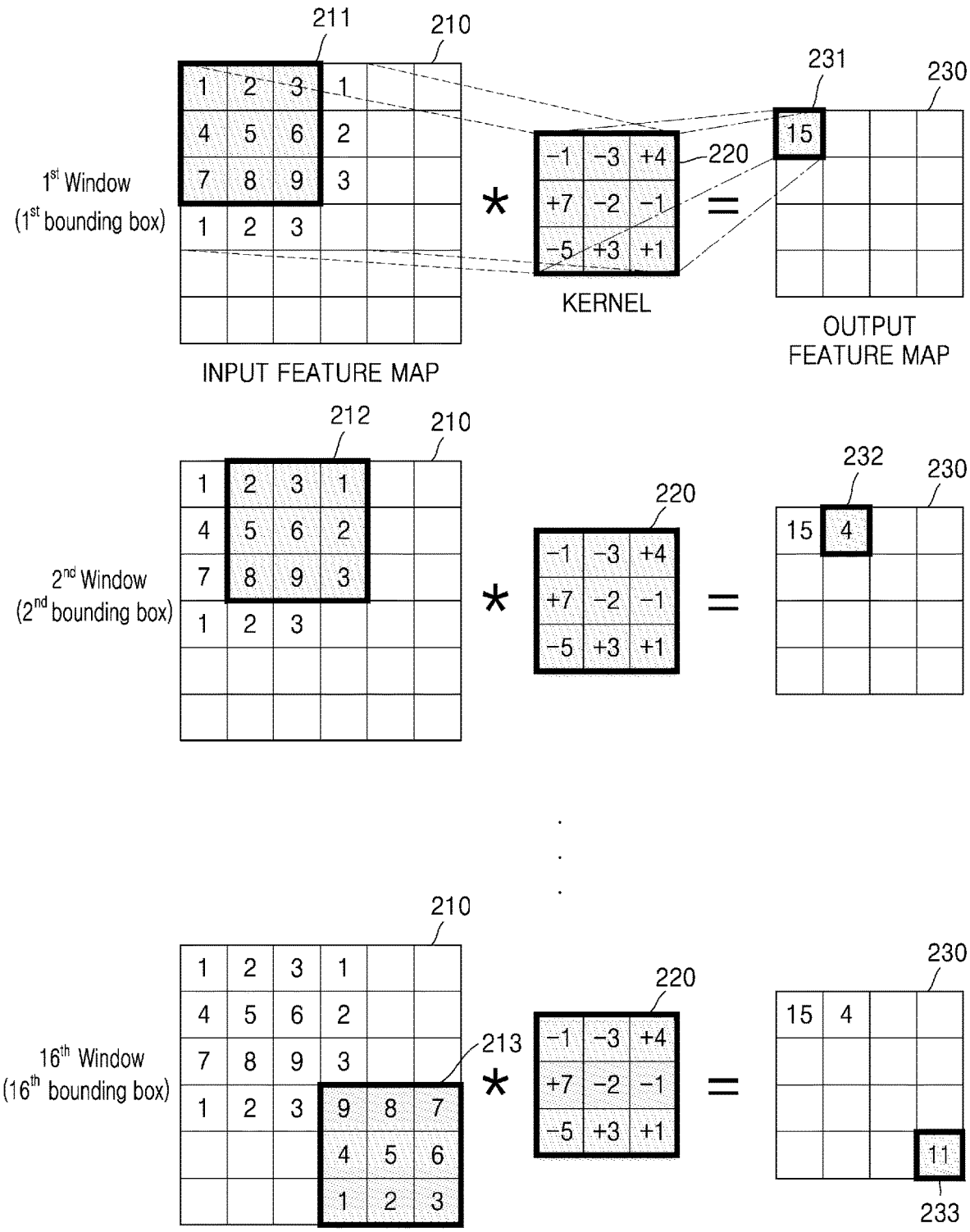

FIGS. 3A and 3B are views of convolution operations of a neural network, according to one or more embodiments.

In FIG. 3A, X-number of channels exist in input feature maps 201, and an input feature map of each channel may have a size of H rows and W columns, where X, W, and H are natural numbers. Each of weight kernels 202 has a size of R rows and S columns, and the weight kernels 202 may each have a number of channels corresponding to the channel number X of the input feature maps 201, and there may be a total of Y weight kernels. The output feature maps 203 may have a total of Y channels, where R, S, and Y are natural numbers. The output feature maps 203 are generated through three-dimensional convolution operations between the input feature maps 201 and the weight kernels 202, and Y-number of channels may exist according to the convolution operations.

A process of generating an output feature map through a convolution operation between one input feature map and one weight kernel is further described below in FIG. 3B. As a two-dimensional convolution operation described in FIG. 3B is repeatedly performed between the input feature maps 201 of all channels and all channels of each of the weight kernels 202, all channels of each the output feature maps 203 may be generated.

In FIG. 3B, it is assumed that an input feature map 210 has a size of 6×6 pixels, a weight kernel 220 has a size of 3×3 pixels, and an output feature map 230 has a size of 4×4 pixels. However, the disclosure is not limited thereto, and a neural network may be implemented as feature maps and kernels having various sizes. Furthermore, the values defined in the input feature map 210, the weight kernel 220 and the output feature map 230 are all exemplary values, and the present embodiments are not limited thereto.

The weight kernel 220 performs a convolution operation by sliding, according to a set of strides, on the input feature map 210 in units of windows or tiles, each having a 3×3 pixel size. A window mapped to the weight kernel 220 in the input feature map 210 may be referred to by the term of a bounding box.

The convolution operation may signify an operation of obtaining each pixel value of the output feature map 230 by summing all values obtained by multiplying each pixel value of a certain window of the input feature map 210 and a weight of each element or each pixel at a corresponding position in the weight kernel 220. In detail, the weight kernel 220 first performs a convolution operation with a first window or first bounding box 211 of the input feature map 210. In other words, each of pixel values 1, 2, 3, 4, 5, 6, 7, 8, and 9 of the first window 211 are respectively multiplied by weights −1, −3, +4, +7, −2, −1, −5, +3, and +1 of the weight kernel 220, and as a result −1, −6, 12, 28, −10, −6, −35, 24, and 9 are obtained. Next, 15 is calculated by summing all obtained values of −1, −6, 12, 28, −10, −6, −35, 24, and 9, and an output pixel value 231 in the first row and the first column of the output feature map 230 is determined to be 15. In this state, the output pixel value 231 in the first row and the first column of the output feature map 230 corresponds to the first window 211. In the same manner, as a convolution operation is performed between a second window or second bounding box 212 of the input feature map 210 and the weight kernel 220, an output pixel value 232 in the first row and the second column of the output feature map 230 is determined to be 4. Finally, as a convolution operation is performed between a sixteenth window or sixteenth bounding box 213 of the last window of the input feature map 210 and the weight kernel 220, an output pixel value 233 in the fourth row and the fourth column of the output feature map 230 is determined to be 11.

In other words, a convolution operation between one input feature map 210 and one weight kernel 220 may be processed by repeatedly performing a multiplication of values of each element corresponding to each other in the input feature map 210 and the original kernel 220 and a sum of multiplication results, and the output feature map 230 is generated as a result of the convolution operation.

As described above, as the above two-dimensional convolution operation is repeatedly performed on the input feature maps of plural channels and plural kernels to generate output feature maps of plural channels, thereby, performing a three-dimensional convolution operation.

FIG. 4 is a view for floating-points and fixed points operations examples.

In an example floating-point 410 of FIG. 4, a floating-point value may be expressed in the form of "$a \times 2^b$". In this state, "a" denotes a fraction or a significand, and "b" denotes an exponent. A single precision (FP32) floating-point value may be expressed as 32 bits including a sign bit of 1 bit, an exponent bit of 8 bits, and a fraction bit of 23 bits.

Next, in an example fixed point 420, a fixed point may be expressed as 1+m+n bits, where m and n are natural numbers. In this state, the 1+m+n bit may include a 1-bit sign bit, an m-bit exponent bit, and an n-bit fraction bit. The bit length to express a fixed point may be changed in various ways according to factors such as precision and processor performance of a neural network.

Figure 5A:
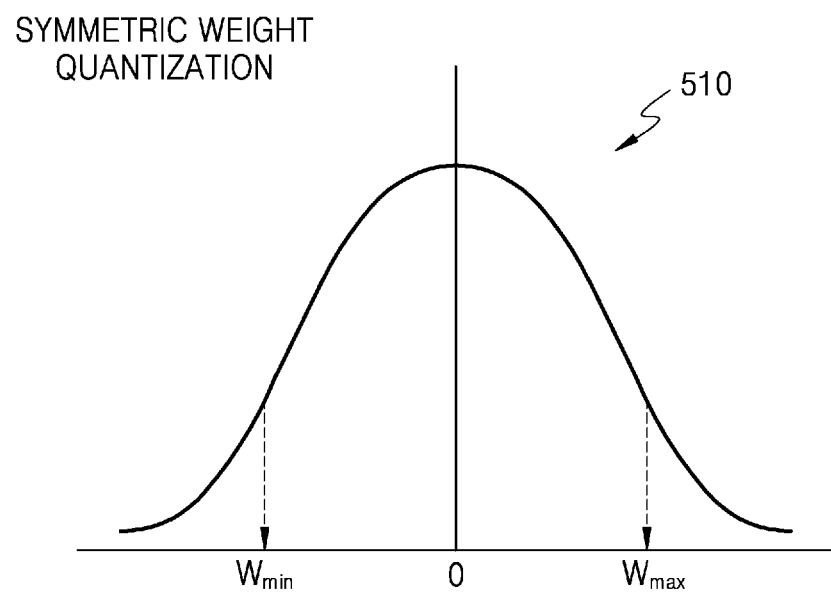

FIGS. 5A and 5B are views of a method of quantizing floating-points to fixed points, according to one or more embodiments.

In a distribution graph 510 of FIG. 5A, weights of a floating-point format may be quantized to have a symmetric distribution with respect to 0. This may be referred to as symmetric weight quantization, where the absolute values of an upper limit threshold value Wmax and a lower limit threshold value Wmin of a dynamic range of a weight quantized as a result of the symmetric weight quantization are identical to each other.

Unlike the symmetric weight quantization of FIG. 5A, weights of a floating-point format may be quantized to have an asymmetric distribution with respect to 0. In other words, according to the asymmetric weight quantization, an average m of a weight distribution may not be 0, as the absolute values of the upper limit threshold value Wmax and the lower limit threshold value Wmin of a dynamic range of the weight quantized as a result of the asymmetric weight quantization may be different from each other.

Unlike a case in which a convolution operation of a neural network is performed by using symmetric quantized weights, when a convolution operation of a neural network is performed by using asymmetrically quantized weights, it may be desirable to remove an offset regarding a result, that is, an output feature map, of the convolution operation. In other words, when a convolution operation is performed between the asymmetrically quantized weights and the input feature maps or input activations, residual data as much as an offset of asymmetrically quantized weights exists in a result, that is, an output feature map, of a convolution operation. Accordingly, an operation to remove residual data from a result of the convolution operation may be desirable.

FIG. 6 is a view for example weight offset of a convolution operation generated by an asymmetrically quantized weight.

In FIG. 6, a convolution operation between input feature maps, or input activations, and asymmetrically quantized weights may be expressed as Equation 2.

$$a \otimes w + b = \qquad \qquad \text{Equation 2}$$

$$\left[ \sum^{ch_0} \sum^{ch_i} \hat{a} \cdot \left( \frac{1}{sf_{Ai}} \hat{w} \right) - off_W \cdot \sum^{ch_0} \frac{1}{sf_{Ai}} \sum^{ch_i} \hat{a} + sf_W \cdot b \right] \cdot \frac{1}{sf_W}$$

The term of an offset, or residual data, of $$off_W \cdot \sum^{ch_0} \frac{1}{sf_{Ai}} \sum^{ch_i} \hat{a}$$

is included in the convolution operation based on an asymmetrically quantized weight expressed in Equation 2. Accordingly, when the weight offset corresponding to $$off_W \cdot \sum^{ch_0} \frac{1}{sf_{Ai}} \sum^{ch_i} \hat{a}$$

is subtracted from a result of the convolution operation, it may be approximated as the result of a convolution operation based on the symmetric quantized weight.

Figure 7:
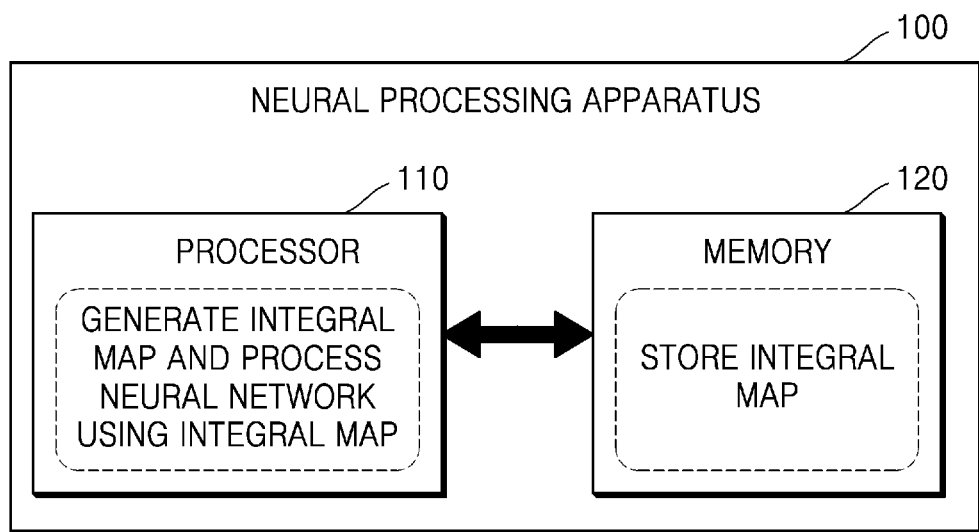
FIG. 7 is a block diagram of a hardware configuration of a neural processing apparatus according to one or more embodiments.

FIG. 7 is a block diagram of a hardware configuration of a neural processing apparatus 100 according to one or more embodiments.

In FIG. 7, the neural processing apparatus 100 may include at least one processor 110 and at least one memory 120. In the neural processing apparatus 100 illustrated in FIG. 7, only some elements related to one or more embodiments are illustrated. Accordingly, the neural processing apparatus 100 may further include other or additional constituent elements than the elements illustrated in FIG. 7.

The neural processing apparatus 100 may correspond to a computing device for performing a neural network. For example, the neural processing apparatus 100 may correspond to a personal computer (PC), a server device, or a mobile device, or an accelerator for performing a neural network operation in such devices. Furthermore, the neural processing apparatus 100 may be provided as, or in autonomous cars, robotics, smartphones, tablet devices, augmented reality (AR) device, Internet of Things (IoT) devices, etc., which perform voice recognition or image recognition by using a neural network. However, the neural processing apparatus 100 is not limited thereto, and may correspond to various type of devices or processing apparatuses for performing a neural network operation in such devices.

The processor 110 is a hardware component that performs control functions for controlling operations of the neural processing apparatus 100. For example, the processor 110 may generally control the neural processing apparatus 100 by processing or executing instructions and/or data stored in the neural processing apparatus 100. The processor 110 may be implemented as a central processing unit (CPU), a graphics processing unit (GPU), an application processor (AP), a neural processing unit (NPU), a tensor processing unit (TPU), which are provided in the neural processing apparatus 100, but the disclosure is not limited thereto.

The memory 120 is hardware for storing various neural network data processed or to be processed in the processor 110. For example, the memory 120 may store input/output feature map data or convolution data, which are processed in a neural network. Furthermore, the memory 120 may store various applications, for example convolution processing applications, to be driven by the processor 110 based on executed instructions for the same.

The memory 120 may correspond to memory devices such as random access memory (RAM), read only memory (ROM), hard disk drives (HDDs), solid state drives (SSDs), compact flash (CF), secure digital (SD), micro secure digital (Micro-SD), mini secure digital (Mini-SD), extreme digital (xD), or Memory Sticks, but the type of the memory 120 is not limited thereto and may be various.

The processor 110 may generate an integral map by removing the above-described weight offset, or residual data, from the result of a convolution operation.

In detail, the processor 110 generates in integral map for each channel based on the calculation of area sums of pixel values in an output feature map, from output feature maps of channels included in a certain layer, for example, Layer$_{i-1}$, where i is a natural number, of a neural network. In this state, the integral map represents data obtained by setting a value obtained by summing pixel values in an area from a reference pixel of an output feature map of a certain layer or Layer$_{i-1}$, to another output pixel of the output feature map to a value of an integral map pixel corresponding to the position of the output pixel.

The processor 110 generates an accumulated integral map by performing accumulated operations on integral maps generated for the respective channels. In this state, the accumulated integral map may be generated by performing a pixel-wise accumulated operation on the integral maps generated for the respective channels.

The processor 110 obtains pre-output feature maps of a next layer, for example, Layer$_i$, by performing a convolution operation between input feature maps and weight kernels of the next layer Layer$_i$. In this state, the "pre-output feature map" according to one or more embodiments may be defined to mean an output feature map from which a weight offset is not removed yet.

The processor 110 obtains output feature maps of the next layer Layer$_i$, by subtracting accumulated values included in the accumulated integral map from the pixel values of the pre-output feature maps to remove offsets existing in the weight kernels.

When the weight kernels used for a convolution operation of the next layer Layer$_i$ are the weights obtained by asymmetric quantization, the processor 110 may remove the weight offset from the output feature maps, that is, the accumulated integral map, of a previous layer Layer$_{i-1}$.

The memory 120 may store integral maps and an accumulated integral map generated at each layer, and when the processor 110 completes a convolution operation on a current layer, may provide the accumulated integral map stored for the previous layer to the processor 110.

Figure 8:
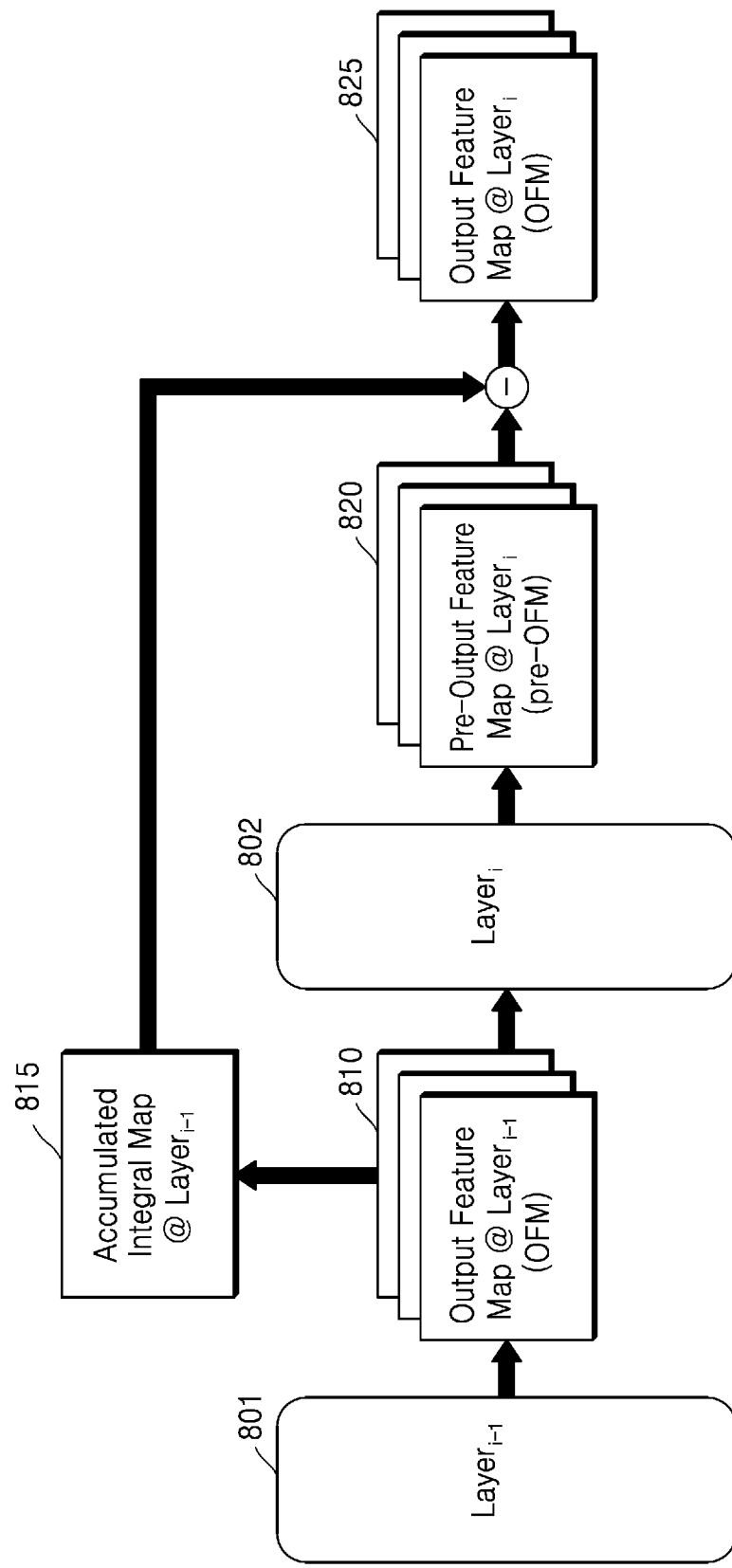
FIG. 8 is a view of a removal of a weight offset by using an integral map, according to one or more embodiments.

FIG. 8 is a view of a removal of a weight offset by using an integral map, according to one or more embodiments.

In FIG. 8, the processor 110 of FIG. 7 may obtain output feature maps 810 for each channel by performing a convolution operation on a Layer$_{i-1}$ 801.

The processor 110 generates, from the output feature maps 810 of channels included in the Layer$_{i-1}$ 801, an integral map for each channel based on the calculation of area sums of pixel values in the output feature maps 810. As described above, the integral map includes data obtained by setting a value obtained by summing pixel values included in an area around or from a reference pixel of the output feature maps 810 of the Layer$_{i-1}$ 801 to other output pixels of the output feature maps 810, to a value in an integral map pixel corresponding to the position of an output pixel. In this state, the reference pixel may be set to one of four corner pixels of each of the output feature maps 810, which is further described below in detail with reference to FIG. 9.

The processor 110 generates an accumulated integral map 815 of the Layer$_{i-1}$ 801 by performing an accumulation operation on the integral maps generated for the respective channels. An accumulation operation, for example, computes the product of two numbers and adds that product to an accumulator. In this state, the accumulated integral map may be generated by performing a pixel-wise accumulation operation on the integral maps generated for the respective channels, which is further described below in further detail with reference to FIG. 10.

Aside from the generation of the integral maps and the accumulated integral map 815, the processor 110 obtained the pre-output feature maps 820 of the Layer$_i$ 802 by performing a convolution operation between the input feature maps and the weight kernels of the Layer$_i$ 802. In this state, as the Layer$_i$ 802 is a layer subsequent to the Layer$_{i-1}$ 801, the input feature maps of the Layer$_i$ 802 correspond to the output feature maps 810 of the Layer$_{i-1}$ 801. The weight kernels may include weights obtained by asymmetric quantization of the neural network. Accordingly, the accumulated integral map 815 generated from the Layer$_{i-1}$ 801 may correspond to data about offsets of weight kernels of the Layer$_i$ 802 generated by the asymmetric quantization of a neural network.

Next, the processor 110 may use the accumulated integral map 815 to remove offsets existing in weight kernels, from the pre-output feature maps 820. In other words, the processor 110 subtracts the accumulated values included in the accumulated integral map 815 from the pixel values of the pre-output feature maps 820. As described above, as the accumulated integral map 815 corresponds to data about offsets, the accumulated values included in the accumulated integral map 815 are related to the offsets.

In further detail, to obtain a pre-output pixel of the pre-output feature maps 820 of the Layer$_i$ 802, the processor 110 determines a bounding box (e.g., see FIG. 3B) of the input feature map mapped to the weight kernel, and obtains pixel values set to pixels of the accumulated integral map 815 of the four corner pixels of a bounding box. Then, the processor 110 calculates an offset existing in the pixel value of a pre-output pixel by using the obtained pixel values. Then, the processor 110 obtains an output pixel of an output feature map 825 by subtracting the previously calculated offset from the pixel value of the pre-output pixel. A method of using corner pixels of a bounding box is described below in further detail with reference to FIGS. 11A and 11B.

In FIG. 8, for convenience of explanation, an example of removing a weight offset by using an integral map only in a relationship of two layers of the Layer$_{i-1}$ 801 and the Layer$_i$ 802 is described. However, the disclosure is not limited thereto, and the output feature maps 810 of the Layer$_{i-1}$ 801 may be obtained by using an integral map of the previous layer, for example, Layer$_{i-2}$, in the same manner. In other words, in one or more embodiments, a similar or same manner may be applied to a plurality of a plurality of layers included in a neural network.

Figure 9:
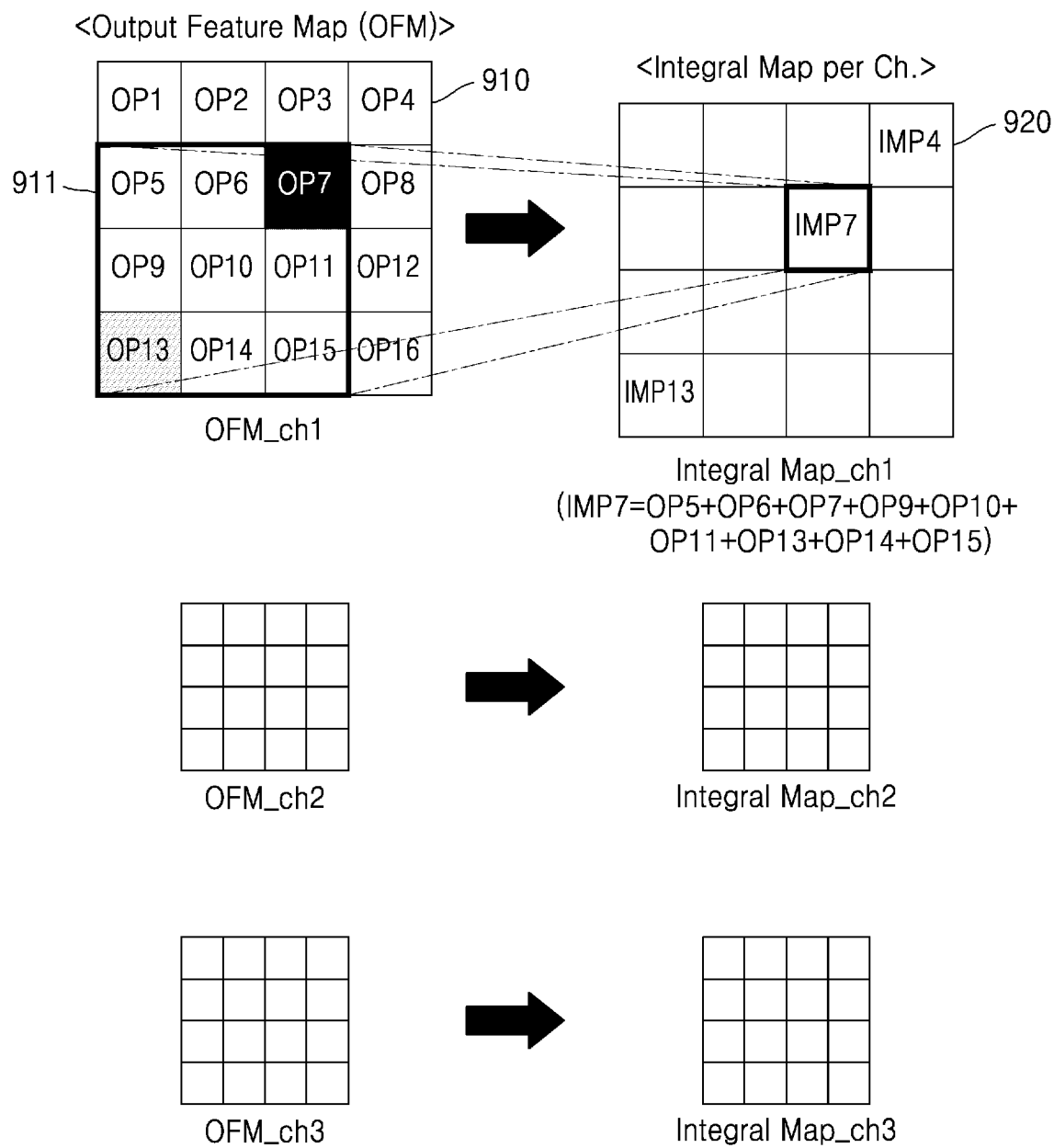
FIG. 9 is a view of a generation of an integral map from an output feature map, according to one or more embodiments.

FIG. 9 is a view of a generation of an integral map from an output feature map, according to one or more embodiments.

In FIG. 9, although i only three channels are discussed, the disclosure is not limited thereto, and various numbers of channels may exist in a layer.

An output feature map OFM_ch1 910 may be a feature map having a 4×4 size, and the output pixels of the output feature map 910 may be referred to as OP1 to OP16.

In the example of FIG. 9, for convenience of explanation, it is assumed that a reference pixel to generate an integral map Integral Map_ch1 920 is a pixel OP13 located at the lower left corner of the output feature map 910. However, as the reference pixel may be set to one of the four corner pixels of the output feature map 910, the disclosure is not limited thereto, and a pixel, for example, OP1, OP4, or OP16, of the output feature map 910 may be set to the reference pixel.

For example, calculating an integral map pixel IMP7 of an integral map 920 is described below. The position of the integral map pixel IMP7 in the integral map 920 corresponds to the position of an output pixel OP7 in the output feature map 910. The processor 110 of FIG. 7 sums all pixel values included in an area 911, from the reference pixel OP13 to the output pixel OP7. The processor 110 sets a summed value to a value in the integral map pixel IMP7 corresponding to the position of the output pixel OP7. In other words, IMP7=OP5+OP6+OP7+OP9+OP10+OP11+OP13+OP14+OP15.

The processor 110 generates the integral map 920 by calculating a pixel value in the same manner with respect to each integral map pixel of the integral map 920. As the reference pixel is set to OP13 in the output feature map 910, the pixel value of the integral map pixel IMP13 of the integral map 920 is the same as the pixel value of the output pixel OP13, and the pixel value of an integral map pixel IMP4 of the integral map 920 corresponds to the sum of pixel values of all output pixels of the output feature map 910.

The processor 110 generates not only the output feature map 910, but also integral maps for each channel in the same manner with respect to the output feature maps of other channels.

Various examples include various sizes of the output feature map 910, sizes of the integral map 920, and positions of the reference pixel in accordance with the above-described generation method of an integral map.

Figure 10:
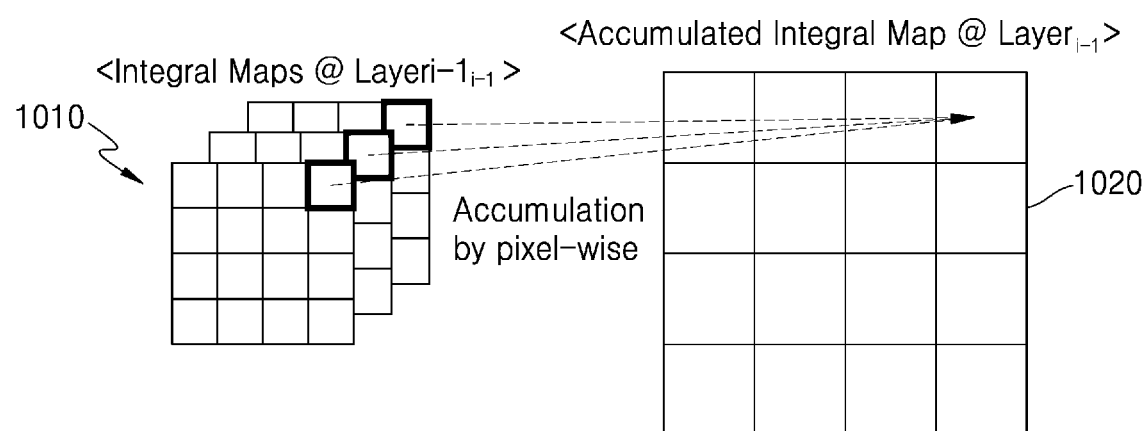
FIG. 10 is a view of a generation of an accumulated integral map by using integral maps, according to one or more embodiments.

FIG. 10 is a view of a generation of an accumulated integral map by using integral maps, according to one or more embodiments.

In FIG. 10, integral maps 1010 for each channel may be generated from the output layers of a certain layer, for example, Layer$_{i-1}$.

When the integral maps 1010 are generated, the processor 110 of FIG. 7, for example, may generate an accumulated integral map 1020 by performing a pixel-wise accumulation operation on the integral maps 1010 generated for each channel. For example, a pixel value of an integral map pixel located at the upper right corner of the accumulated integral map 1020 corresponds to a value obtained by accumulating the pixel values of the integral map pixels at the upper right corner of each of the integral maps 1010. Accordingly, the pixel value of each integral map pixel of the accumulated integral map 1020 may be obtained by calculating accumulated pixel values of the corresponding integral map pixels in the integral maps 1010.

When all accumulated values of all integral map pixels of the accumulated integral map 1020 are obtained, the processor 110 defines the accumulated integral map 1020 to be an accumulated integral map of a corresponding layer, for example, Layer$_{i-1}$, and stores the accumulated integral map 1020 in the memory 120 of FIG. 7. As described above, the accumulated integral map 1020 stored in the memory 120 may be used to generate the output feature map of a next layer, for example, Layer$_i$.

Figure 11B:
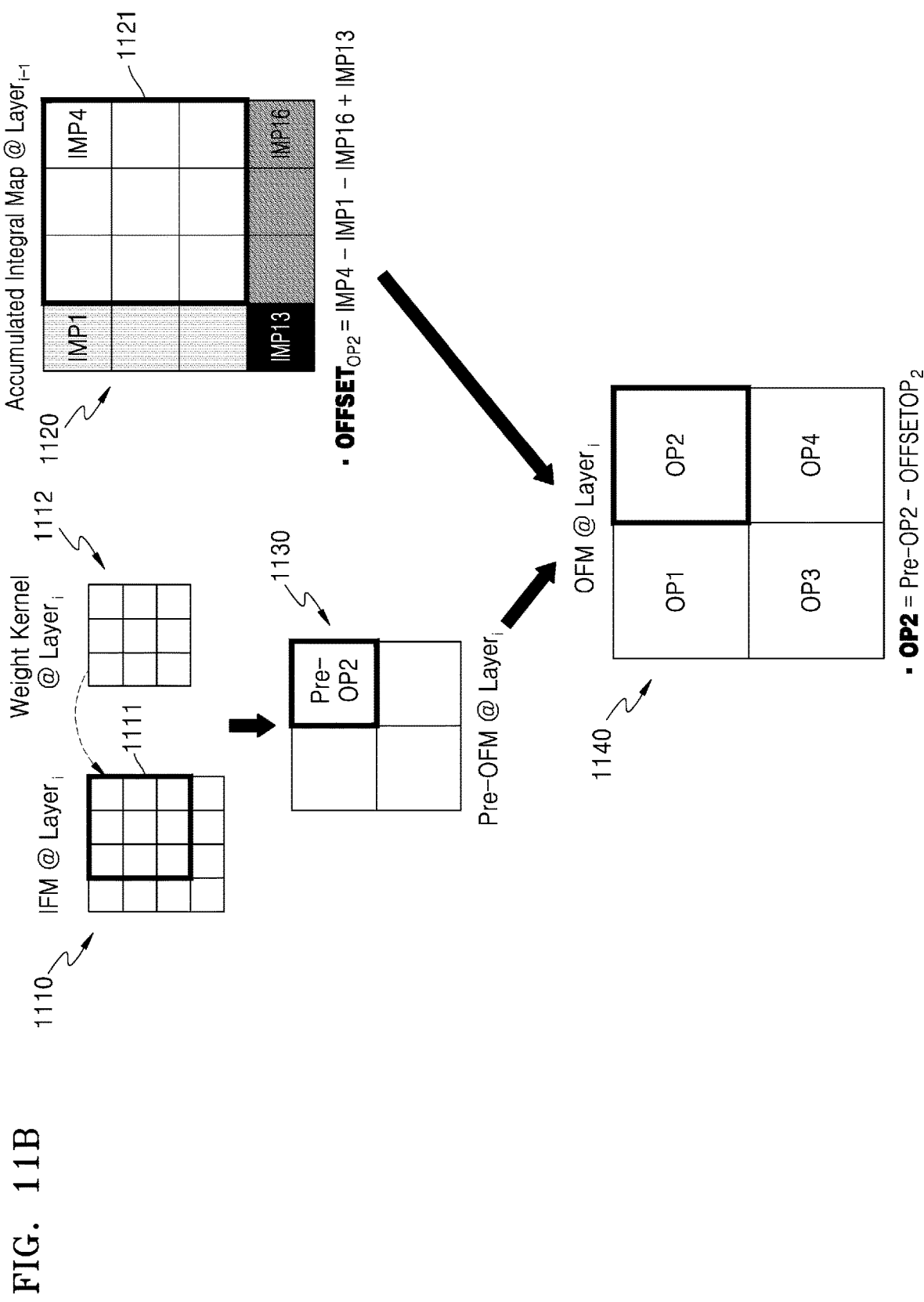

FIGS. 11A and 11B are views for example generation of an output feature map by removing an offset from a pre-output feature map by using an accumulated integral map.

The processor 110 of FIG. 7 determines a bounding box of an input feature map mapped to a weight kernel in order to obtain a pre-output pixel of a pre-output feature map of a certain layer, for example, Layer$_i$. For example, the position of a bounding box of an input feature map determined by the processor 110 is assumed to correspond to an area 1100 of an accumulated integral map in FIG. 11A.

The processor 110 calculates a total accumulated value of the integral map pixels included in the area 1100 in the accumulated integral map. In this state, the total accumulated value corresponds to an area value of the area 1100.

In a detailed description of a process of calculating a total accumulated value, the processor 110 first determines the position of a reference pixel. As assumed above, in FIGS. 11A and 11B, the reference pixel may be assumed to be a pixel at the lower left corner.

FIG. 11A illustrates areas 1100 and 1103 in the accumulated integral map and an exploded view showing areas 1100 and 1103, as well as areas 1101 and 1102 that both include area 1103. In FIG. 11A, the area value of the area 1100 may be calculated as in Equation 3 below.

$$\text{val}(x_d, y_b) - \text{val}(x_c, y_b) - \text{val}(x_d, y_a) + \text{val}(x_c, y_a) \quad \text{Equation 3:}$$

In other words, the area value of the area 1100 may be calculated by subtracting an area value (xc, yb) of the area 1101 and an area value (xd, ya) of the area 1103 from an area value (xd, yb), and adding an area value (xc, ya) of the area 1103. In this state, the area value (xc, ya) of the area 1103 is added because the area value (xc, ya) is necessarily subtracted twice by the areas 1101 and 1102.

When the area value of the area 1100 is calculated in the above manner, a weight offset included in a convolution operation performed in the bounding box corresponding to the area 1100 may be calculated. Thus, the processor 110 may obtain the output pixel value of the output feature map where a weight offset (residual) is removed, by subtracting the area value of the area 1100 from the pre-output pixel value of the pre-output feature map that is a result of the convolution operation performed in the corresponding bounding box of the input feature map.

In FIG. 11B, the method described in FIG. 11A is described by applying the method to the feature maps.

First, the processor 110 obtains an accumulated integral map 1120 generated from the previous layer Layer$_{i-1}$, from the memory 120 of FIG. 7.

The processor 110 performs a convolution operation between a weight kernel 1112 and a bounding box 1111 of an input feature map 1110 on the Layer$_i$. In this state, the bounding box 1111 may be, for example, a bounding box corresponding to the area 1100 of FIG. 11A.

As a result of the convolution operation, the processor 110 may obtain a pre-output pixel Pre-OP2 of a pre-output feature map Pre-OFM 1130 on the Layer$_i$. As described above, an offset (residual) OFFSETOP2 due to the asymmetrically quantized weight may exist in the pre-output pixel Pre-OP2.

The processor 110 may use the accumulated integral map 1120 to calculate an offset OFFSETOP2. In detail, the processor 110 determines the bounding box 1111 of the input feature map 1110 mapped to the weight kernel 1112, and obtains pixel values set to pixels of the accumulated integral map 1120 corresponding to four corner pixels of the bounding box 1111.

The four corner pixels of the bounding box 1111 may include an upper right pixel, an upper left pixel, a lower right pixel, and a lower left pixel of the bounding box 1111. The processor 110 obtains, from the accumulated integral map 1120, a pixel value of a first integral map pixel IMP4 corresponding to the upper right pixel of the bounding box 1111, a pixel value of a second integral map pixel IMP1 corresponding to the upper left pixel of the bounding box 1111, a pixel value of a third integral map pixel IMP16 corresponding to the lower right pixel of the bounding box 1111, and a pixel value of a fourth integral map pixel IMP13 corresponding to the lower left pixel of the bounding box 1111. In other words, the processor 110 obtains pixel values of the first to fourth integral map pixels IMP4, IMP1, IMP16, and IMP13 with respect to an area 1121 of the accumulated integral map 1120 corresponding to the bounding box 1111.

Then, as the reference pixel for generating the accumulated integral map 1120 is a pixel at the lower left corner of the output feature map of the previous layer Layer$_{i-1}$, the processor 110 calculate the offset OFFSETOP2 existing in the pixel value of the pre-output pixel Pre-OP2, by subtracting the pixel value of the second integral map pixel IMP1 and the pixel value of the third integral map pixel IMP16 from the sum of the pixel value of the first integral map pixel IMP4 and the pixel value of the fourth integral map pixel IMP13. In other words, the processor 110 may calculate the offset OFFSETOP2 by applying the principle described in FIG. 11A.

Thus, the processor 110 may obtain the output pixel OP2 of an output feature map 1140 of Layer$_i$, by subtracting the this calculated offset OFFSETOP2 from the pixel value of the pre-output pixel Pre-OP2.

The processor 110 may obtain the other output pixels OP1, OP3, and OP4 by using the above-described methods, and may finally generate the output feature map 1140 where the offset due to the asymmetrically quantized weight is removed, according to the above-described methods.

In the described examples, for convenience of explanation, although feature maps having a specific size, weight kernels having a specific size, and a reference pixel at a specific position are exampled in the description, the method may be performed on one or more embodiments are not limited thereto, and examples include feature maps having various sizes, weight kernels having various sizes, and a reference pixel at various positions in a similar or corresponding manner.

The method of removing an offset of an output feature map by using an integral map according to one or more embodiments may relatively lower complexity as much as 3 orders, for example, as shown in Equation 4 below, compared to the complexity of a typical approach of, "$1 \times c \times h_k \times w_k \times h_{a_i} \times w_{a_i}$".

$$c \times h_{a_{i-1}} \times w_{a_{i-1}} + 3 \times l \times h_{a_i} \times w_{a_i} \approx (c + 3l) \times h_{a_{i-1}} \times w_{a_{i-1}} \qquad \text{Equation 4}$$

Figure 12:
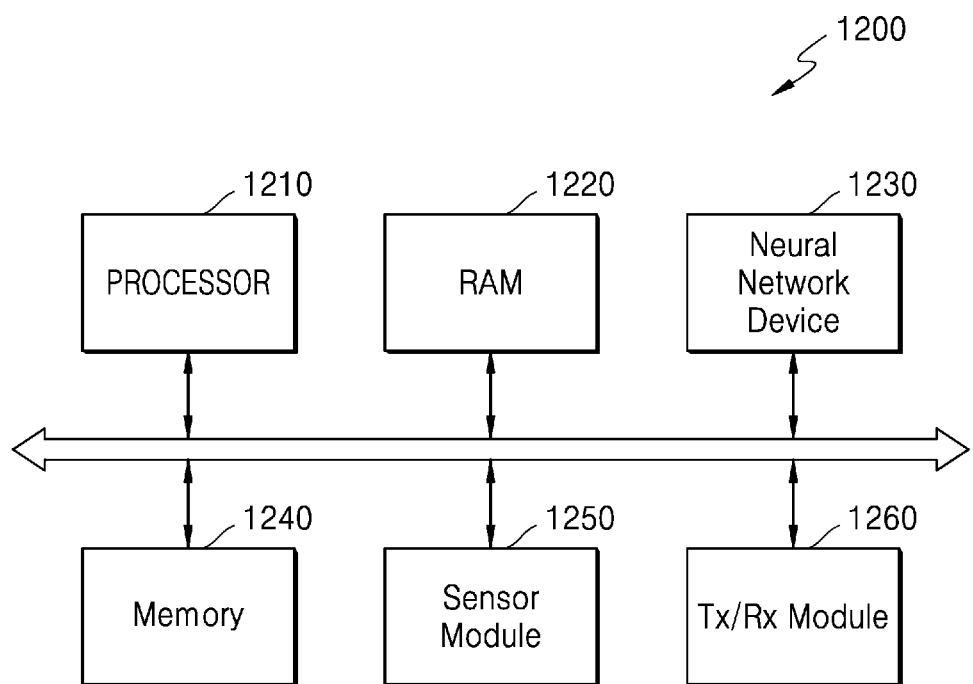
FIG. 12 is a block diagram of an electronic system, according to one or more embodiments.

FIG. 12 is a block diagram of an electronic system 1200, according to one or more embodiments.

In FIG. 12, the electronic system 1200 may analyze in real-time input data based on a neural network to extract valid information, determine a situation based on the extracted information, or control an electronic device on which the electronic system 1200 is mounted. For example, the electronic system 1200 may be, or be applied to robotic devices such as drones or advanced drivers assistance systems (ADAS), smart TVs, smart phones, medical devices, mobile devices, image display devices, measurement devices, IoT devices, etc. In addition, the electronic system 1200 may be, or mounted on, at least, one of various types of electronic devices.

The electronic system 1200 may include a processor 1210, a RAM 1220, a neural network device 1230, a memory 1240, a sensor module 1250, and a communication module 1260. The electronic system 1200 may further include an input/output module, a security module, or a power control device. Some of the hardware components of the electronic system 1200 may be mounted on at least one semiconductor chip. The neural network device 1230, may be a device including the neural processing apparatus 100 that is described in FIG. 7, and may be a neural network dedicated hardware accelerator or a device including the same. The neural processing apparatus 100 of FIG. 7 may also be the electronic system 1200.

The processor 1210 controls the overall operation of the electronic system 1200. The processor 1210 may include one processor core (single core) or a plurality of processor cores (multi-core). The processor 1210 may process or execute instructions and/or data stored in the memory 1240. In an embodiment, the processor 1210 may control the function of the neural network device 1230 by executing the instructions stored in the memory 1240. The processor 1210 may be implemented as a CPU, a GPU, or an AP.

The RAM 1220 may temporarily store programs, data, or instructions. For example, the instructions and/or data stored in the memory 1240 may be temporarily stored in the RAM 1220 according to control or booting codes of the processor 1210. The RAM 1220 may be implemented as memory such as dynamic RAM (DRAM) or static RAM (SRAM).

The neural network device 1230 may perform an operation of a neural network based on the received input data and generate an information signal based on a result of the operation. The neural network may include CNN, RNN, a deep belief network, or a restricted Boltzman machine, but the disclosure is not limited thereto. The neural network device 1230, which is hardware for processing by using a neural network, may correspond to a neural network dedicated hardware accelerator including the neural processing apparatus 100 that is described in FIG. 7, for example.

The information signal may include one of various types of recognition signals such as a voice recognition signal, an object recognition signal, an image recognition signal, a biometric information recognition signal, etc. For example, the neural network device 1230 may receive frame data included in a video stream, as input data, and generate from the frame data a recognition signal regarding an object included in an image that the frame data indicates. However, the disclosure is not limited thereto, and, according to the type or function of an electronic device on which the electronic system 1200 is, or is mounted, the neural network device 1230 may receive various types of input data and generate a recognition signal based on the input data.

The memory 1240, which is a place for storing data, may store an operating system (OS) program, various instructions, and various data. In an embodiment, the memory 1240 may store neural network data, for example, floating-point type or fixed-point type input/output activations or weights, which are generated during the operation of the neural network device 1230. In an embodiment, the memory 1240 may store parameters for a mixed-precision MAC operation. Furthermore, the memory 1240 may store parameters that are encoded by an extended bit format.

The memory 1240 may be DRAM, but the disclosure is not limited thereto. The memory 1240 may include at least one of volatile memory or non-volatile memory. The non-volatile memory may include ROM, PROM, EPROM, EEPROM, flash memory, PRAM, MRAM, RRAM, FRAM, etc. The volatile memory may include DRAM, SRAM, SDRAM, PRAM, MRAM, RRAM, FeRAM, etc. In an embodiment, the memory 1240 may include at least one of HDD, SSD, CF, SD, Micro-SD, Mini-SD, xD, or Memory Stick.

In an example, the sensor module 1250 may collect information around an electronic device on which the electronic system 1200 is mounted, or around the electronic system 1200 when the electronic system 1200 is the electronic device. The sensor module 1250 may sense or receive signals outside an electronic device, for example, video signals, voice signals, magnetic signals, biometric signals, touch signals, etc., and convert the sensed or received signal to data. To this end, the sensor module 1250 may include at least one of various types of sensing devices, for example, microphones, imaging devices, image sensors, light detection and ranging (LIDAR) sensors, ultrasonic sensors, infrared sensors, biosensors, touch sensors, etc.

The sensor module 1250 may provide the converted data to the neural network device 1230 as input data. For example, the sensor module 1250 may include an image sensor, generate a video stream by capturing the external environment of an electronic device, and provide, as input data, in order continuous data frames of the video stream to the neural network device 1230. However, the disclosure is not limited thereto, and the sensor module 1250 may provide various types of data to the neural network device 1230.

The communication module 1260 may be provided with various wired or wireless interfaces capable of communicating with an external apparatus. For example, the communication module 1260 may include communication interfaces capable of connecting to wireless local area networks (WLANs), such as wired local area networks (LANs) or wireless fidelity (Wi-Fi), wireless personal area networks (WPANs), such as Bluetooth, and mobile cellular networks, such as wireless universal serial bus (USB), Zigbee, near field communication (NFC), radio-frequency identification (RFID), power line communication (PLC), or 3rd generation (3G), 4th generation (4G), long term evolution (LTE), or 5G (5th Generation).

In an embodiment, the communication module 1260 may receive data about a quantized neural network from an external device. In this state, the external device may be a device that performs neural network training based on a huge amount of data, quantizes the trained neural network to a fixed point type, and provides the quantized neural network data to the electronic system 1200. The received quantized neural network data may be stored in the memory 1240.

Figure 13:
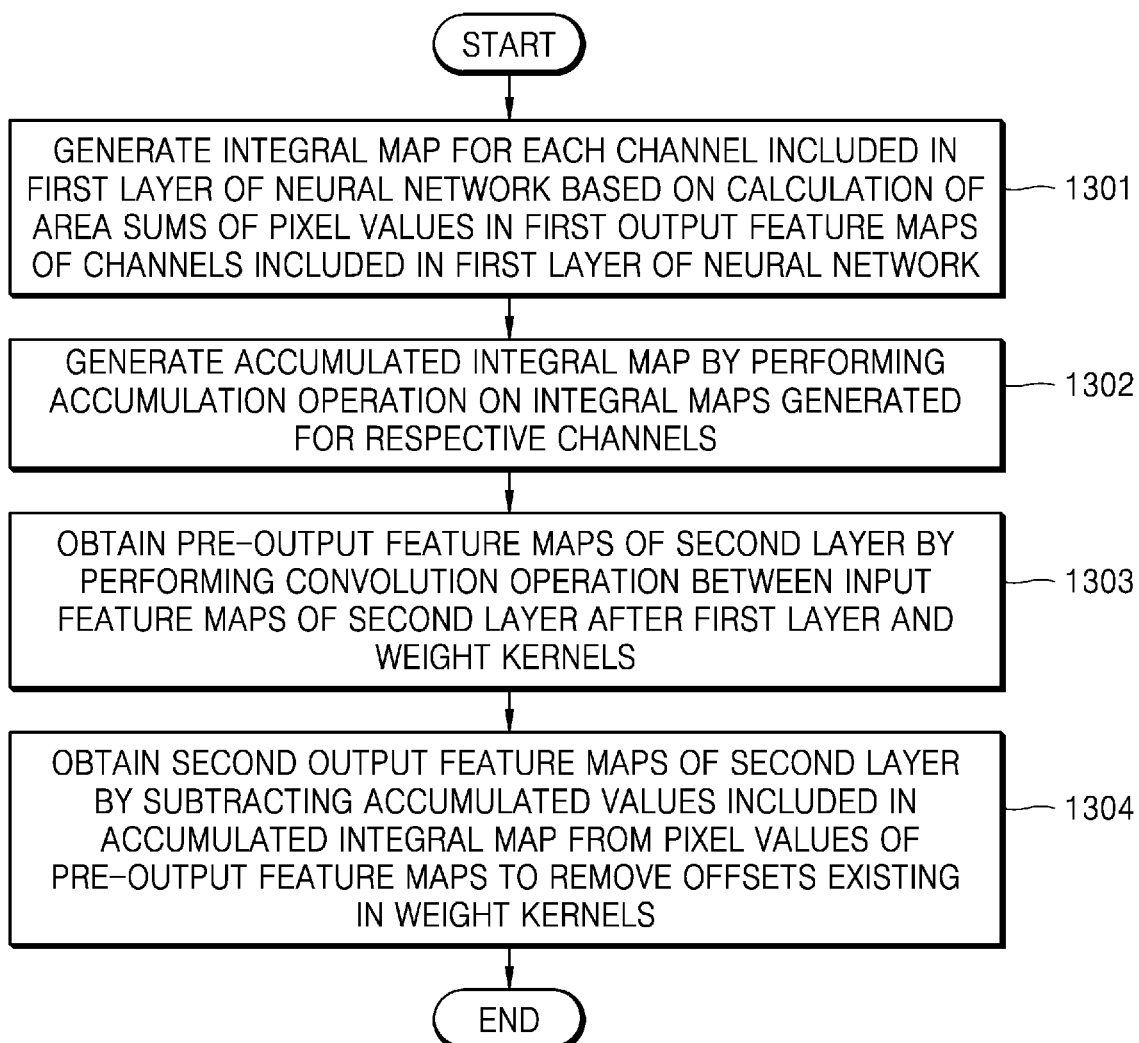
FIG. 13 is a flowchart of a method of processing a neural network in a neural processing apparatus, according to one or more embodiments.

FIG. 13 is a flowchart of a method of processing a neural network in a neural processing apparatus, according to one or more embodiments. In FIG. 13, as the method of processing a floating-point operation in the neural processing apparatus 100 of FIG. 7 is related to the embodiments described in the above-described drawings, the descriptions presented above, though not repeated here, may also apply to the method of FIG. 13.

In operation 1301, the processor 110 of FIG. 7 generates an integral map for each channel based on the calculation of area sums of the pixel values in a first output feature map, from the first output feature maps of channels included in a first layer of a neural network.

In operation 1302, the processor 110 generates an accumulated integral map by performing an accumulation operation on the integral maps generated for the respective channels.

In operation 1303, the processor 110 obtains pre-output feature maps of a subsequent second layer by performing a convolution operation between input feature maps of a second layer and weight kernels.

In operation 1304, the processor 110 obtains second output feature maps of the second layer by subtracting accumulated values included in the accumulated integral map from the pixel values of the pre-output feature maps to remove offsets existing in the weight kernels.

The neural processing apparatus, neural processing apparatus 100, processor, processor 110, 1210, memory, memory 120, 1240, ram 1220, neural network device 1230, sensor module 1250, Tx/Rx module 1260 in FIGS. 1-13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   generating respective integral maps based on calculating of area sums of respective pixel values in each of plural channels of a first output feature map from a first layer of a neural network;
   generating an accumulated integral map by performing an accumulation operation on the respective integral maps;
   obtaining plural channels of a pre-output feature map of a second layer, subsequent to the first layer, in the neural network by performing convolution operations between plural channels of an input feature map of the second layer and weight kernels; and
   generating plural channels of an output feature map of the second layer by, for each channel of the output feature map, subtracting select accumulated values of the accumulated integral map from corresponding pixel values of the pre-output feature map.

2. The method of claim 1, further comprising performing recognition of the second output feature maps.

3. The method of claim 1, further comprising generating the weight kernels by asymmetric quantization of trained weight kernels for the second layer.

4. The method of claim 1, wherein the generation of the respective integral maps include:
   summing pixel values included in an area from a reference pixel of the first output feature map to a first output pixel of the first output feature map to a value of a pixel in an integral map corresponding to the first output pixel; and
   setting a value of the integral map to be a result of the summing.

5. The method of claim 4, wherein the reference pixel is set to one of four corner pixels of the first output feature map.

6. The method of claim 1, wherein the accumulated integral map is generated by performing a pixel-wise accumulation operation on the respective integral maps.

7. The method of claim 6, wherein the accumulated integral map generated from the first layer corresponds to data for offsets of the weight kernels of the second layer generated by asymmetric quantization of trained weight kernels for the second layer.

8. The method of claim 1, wherein the obtaining of the plural channels of the output feature map comprises:
   determining a bounding box of a channel of the input feature map mapped to a weight kernel to obtain a channel of the pre-output pixel of a pre-output feature map of the second layer;
   obtaining pixel values set to pixels of the accumulated integral map corresponding to four corner pixels of the bounding box;
   calculating an offset of a pixel value of the pre-output pixel based on the obtained pixel values; and
   obtaining a second output pixel of a second output feature map by subtracting the calculated offset from the pixel value of the pre-output pixel.

9. The method of claim 8, wherein
   the four corner pixels of the bounding box comprise an upper right pixel, an upper left pixel, a lower right pixel, and a lower left pixel of the bounding box, and
   the obtaining of pixel values set to pixels of the accumulated integral map comprises,
   obtaining, from the accumulated integral map, a pixel value of a first integral map pixel corresponding to the upper right pixel, a pixel value of a second integral map pixel corresponding to the upper left pixel, a pixel value of a third integral map pixel corresponding to the lower right pixel, and a pixel value of a fourth integral map pixel corresponding to the lower left pixel.

10. The method of claim 9, wherein, upon the reference pixel for generating the accumulated integral map is the lower left pixel of the first output feature map, the calculating of the offset comprises calculating the offset in the pixel value of the pre-output pixel by subtracting a pixel value of the second integral map pixel and a pixel value of the third integral map pixel from a sum of a pixel value of the first integral map pixel and a pixel value of the fourth integral map pixel.

11. A non-transitory computer readable recording medium storing instructions that, when executed by a processor, causes the processor to control performance of the method of claim 1.

12. A neural processing apparatus, comprising:
one or more processors configured to:
generate respective integral maps based on calculating of area sums of respective pixel values in each of plural channels of a first output feature map in the first layer of a neural network;
generate an accumulated integral map by performing an accumulation operation on the respective integral maps;
obtain plural channels of a pre-output feature map of a second layer, subsequent to the first layer, in the neural network by performing convolution operations between plural channels of an input feature map of the second layer and weight kernels; and
generating plural channels of an output feature map of the second layer by, for each channel of the output feature map, subtracting select accumulated values of the accumulated integral map from corresponding pixel values of the pre-output feature map.

13. The apparatus of claim 12, further comprising generating the weight kernels by asymmetric quantization of trained weight kernels for the second layer.

14. The apparatus of claim 12, wherein the generation of the respective integral maps include:
summing pixel values included in an area from a reference pixel of the first output feature map to a first output pixel of the first output feature map to a value of a pixel in an integral map corresponding to the first output pixel; and
setting a value of the integral map to be a result of the summing.

15. The apparatus of claim 14, wherein the reference pixel is set to one of four corner pixels of the first output feature map.

16. The apparatus of claim 12, wherein the accumulated integral map is generated by performing a pixel-wise accumulation operation on the respective integral maps.

17. The apparatus of claim 16, wherein the accumulated integral map generated from the first layer corresponds to data for offsets of the weight kernels of the second layer generated by the asymmetric quantization trained weight kernels for the second layer.

18. The apparatus of claim 12, wherein the one or more processors are further configured to:
determine a bounding box of a channel of the input feature map mapped to a weight kernel to obtain a channel of the pre-output pixel of a pre-output feature map of the second layer;
obtain pixel values set to pixels of the accumulated integral map corresponding to four corner pixels of the bounding box;
calculate an offset in a pixel value of the pre-output pixel based on the obtained pixel values; and
obtain a second output pixel of a second output feature map by subtracting the calculated offset from the pixel value of the pre-output pixel.

19. The apparatus of claim 18, wherein
the four corner pixels of the bounding box comprise an upper right pixel, an upper left pixel, a lower right pixel, and a lower left pixel of the bounding box, and
the one or more processors are further configured to obtain,
from the accumulated integral map, a pixel value of a first integral map pixel corresponding to the upper right pixel, a pixel value of a second integral map pixel corresponding to the upper left pixel, a pixel value of a third integral map pixel corresponding to the lower right pixel, and a pixel value of a fourth integral map pixel corresponding to the lower left pixel.

20. The apparatus of claim 19, wherein the one or more processors are further configured to calculate the offset in the pixel value of the pre-output pixel by subtracting a pixel value of the second integral map pixel and a pixel value of the third integral map pixel from a sum of a pixel value of the first integral map pixel and a pixel value of the fourth integral map pixel, when the reference pixel for generating the accumulated integral map is the lower left pixel of the first output feature map.

21. The apparatus of claim 12, wherein
the one or more processors are further configured to generate the accumulated integral map based on the first output feature maps of the first layer that are read from a memory,
the memory stores the generated accumulated integral map, and
when the pre-output feature maps of the second layer are obtained, the one or more processors are further configured to obtain the second output feature maps of the second layer by performing removal of the offsets by reading the generated accumulated integral map from the memory.

22. A neural processing apparatus, comprising:
one or more processors configured to:
obtain an accumulated integral map;
obtain plural channels of a pre-output feature map of a second layer, subsequent to a first layer, in a neural network by performing convolution operations between plural channels of an input feature map of the second layer and weight kernels; and
generate plural channels of an output feature map of the second layer by, for each channel of the output feature map, subtracting select accumulated values of the accumulated integral map from corresponding pixel values of the pre-output feature map.

23. The apparatus of claim 22, further comprising generating respective integral maps based on calculating of area sums of respective pixel values in each of plural channels of a first output feature map in the first layer of a neural network.

24. The apparatus of claim 23, wherein the accumulated integral map is generated by performing an accumulation operation on the respective integral maps.

* * * * *